United States Patent
Pascovici et al.

[11] Patent Number: 5,883,973
[45] Date of Patent: Mar. 16, 1999

[54] METHOD AND APPARATUS FOR PROCESSING A DOCUMENT BY SEGMENTATION INTO TEXT AND IMAGE AREAS

[75] Inventors: Andrei Pascovici, Mountainview; Joseph S. Shu, San Jose, both of Calif.

[73] Assignee: Seiko Epson Corporation, Tokyo, Japan

[21] Appl. No.: 636,900

[22] Filed: Feb. 20, 1996

[51] Int. Cl.$^6$ .................................................. G06K 9/34
[52] U.S. Cl. .................... 382/176; 382/112; 382/164; 382/169; 382/128; 382/180; 382/226; 382/270; 382/271
[58] Field of Search ..................................... 382/176, 178, 382/112, 164, 169, 226, 180, 270, 271

[56] References Cited

U.S. PATENT DOCUMENTS

| | | | |
|---|---|---|---|
| 4,115,761 | 9/1978 | Ueda et al. | 340/146.3 |
| 4,578,713 | 3/1986 | Tsao et al. | 358/456 |
| 4,639,769 | 1/1987 | Fleisher et al. | 358/21 |
| 4,741,046 | 4/1988 | Matsunawa et al. | 358/456 |
| 5,073,953 | 12/1991 | Westdijk | 382/9 |
| 5,134,666 | 7/1992 | Imao et al. | 382/50 |
| 5,201,014 | 4/1993 | Degi et al. | 358/50 |
| 5,224,178 | 7/1993 | Madden et al. | 382/166 |
| 5,331,442 | 7/1994 | Sorimachi | 358/532 |
| 5,381,241 | 1/1995 | Kawanaka et al. | 358/462 |
| 5,465,304 | 11/1995 | Cullen et al. | 382/9 |
| 5,651,077 | 7/1997 | Dong et al. | 382/51 |
| 5,724,456 | 3/1998 | Boyack et al. | 382/254 |

*Primary Examiner*—Christopher S Kelley
*Assistant Examiner*—Sheela Chawan

[57] ABSTRACT

A multi-stage, preprocessing technique increases the quality of a monochrome or colored mixed-mode document printed on a binary-type printer. The document is preferably apportioned into a plurality of small tiles, each of which provides information to the inventive technique for eventually defining the modes as either text or images. The multi-stage technique comprises a first stage for normalizing a non-ideal histogram of the mixed-mode document to a histogram having an ideal distribution of selected pixel values. A second stage classifies each tile as either text, image or background, while a third stage collates groups of tiles in both vertical and horizontal directions to remove variances in the document. Those portions of the document classified as images are then halftone processed, while the text areas are threshold processed to thereby significantly improve the reproduction quality of the printed document.

19 Claims, 11 Drawing Sheets

| T | T | T | I | T | T | T | I | T | T | T |
|---|---|---|---|---|---|---|---|---|---|---|
| T | T | T | T | T | I | T | T | T | T | T |
| B | B | B | T | T | T | T | T | B | B | B |
| B | B | I | I | I | I | I | I | I | B | B |
| B | I | I | I | T | T | I | I | I | I | B |
| I | I | I | B | B | B | I | I | I | I | I |
| I | I | I | I | B | I | I | I | I | I | I |
| I | I | I | I | I | I | I | I | I | I | I |
| I | I | I | I | B | I | I | I | I | I | I |
| I | I | I | B | B | B | I | I | I | I | I |
| B | T | T | T | B | B | T | T | T | T | B |
| B | B | B | T | T | T | T | T | B | B | B |

FIG. 8

METHOD AND APPARATUS FOR PROCESSING A DOCUMENT BY SEGMENTATION INTO TEXT AND IMAGE AREAS

FIELD OF THE INVENTION

This invention relates generally to digital printing devices and, in particular, to a technique for processing a document having areas of image and text for printing on such devices.

BACKGROUND OF THE INVENTION

Most computer-driven printing devices which generate hard copy, such as laser, dot-matrix and ink-jet printers, print in a binary fashion—the output medium is divided into an array of picture elements or pixels and the devices can either print a small colored dot at each pixel location or leave the pixel location blank. In the case of monochrome printers, all of the dots are printed with a single color, whereas with color printers a dot color is chosen from a small set of colors. In any case, each dot has a generally uniform color so that the resulting output consists of an array of colored and blank pixels.

Text images are typically printed as hard copy characters in either black or white text. Pictorial images, such as those produced by photographic techniques or by computerized imaging systems, by contrast, are continuous in tonality. If a monochrome image is divided into pixels, each pixel exhibits a gray scale color whose tonal value falls within a range of tonal values. Similarly, if a color image is divided into pixels, each pixel exhibits a hue and an intensity which fall in ranges. In order to reproduce such continuous-tone images by means of electronic printing, the images must be converted into a form which is suited to the characteristics of the printing device, e.g., generally a binary format. This conversion process, which may take many forms, is generically referred to as halftoning. Although a halftone image actually consists solely of a spatial pattern of binary pixels (colored or blank dots), the human visual system integrates this pattern to create an illusion of a continuous-tone image.

During the printing process, the image to be printed is divided into a series of pixels and the value of the image in each pixel is quantized to produce a multi-bit digital word which represents the tonal value of the pixel. The image is thus converted to a stream of digital words which are provided to the printing device. In order to convert the format of each word into a format suitable for reproduction on the digital device, halftoning is performed on the digital word stream during a process called preprocessing. Numerous halftoning techniques have been developed and refined over the years. In their simplest form, such techniques compare the value of each digital word with a threshold level, and generate a binary output pixel value depending on the relative values; this simple type of "threshold" processing is also typically performed on text images.

For example, a digital scanner processing a monochrome image generates a stream of multi-bit words representing the detected light intensities. The numerical value of these words typically ranges from 0 to 255 corresponding to a 256-level gray scale or an 8-bit word. If such a digital word stream is to be reproduced on a binary printing device, the simple thresholding process typically compares the scanner output words with a single (threshold) value to produce the required binary output pixel stream. Illustratively, the fixed threshold value may be 128 for a gray scale value range between 0 and 255. In such a system, each 8-bit scanner word has effectively been compressed into a single-bit output word.

Color images are typically processed by separating each color into one or more color components or "primaries" whose superposition generates the desired color. Generally, three primary colors (either the conventional additive primary colors, i.e., red, green and blue, or the conventional subtractive primary colors, i.e., cyan, magenta and yellow) are used. A digital scanner processing a continuous-tone color image generates a stream of multi-bit words for each of the three color components. The numerical value of these words also ranges from 0 to 255, corresponding to 256 intensity levels or an 8-bit word. Thus, each colored pixel is represented by three 8-bit words or 24-bits total.

The digital word stream corresponding to a colored image is halftoned by comparing the 8-bit word for each color component with a threshold value in the same manner as monochrome processing. The color components are processed separately so that the three 8-bit scanner words are compressed into a 3-bit output word which is eventually printed as three dots—each dot being printed in one of the primary colors.

When processing a monochrome or colored mixed-mode document, it is preferable to distinguish between those areas that are image and text, and to process them differently. For example, threshold processing of text improves the clarity of the printed characters, while halftoning operations increase the reproduction quality of images printed on a document. However, distinguishing between text and image areas is rather difficult, particularly for documents with overlaying portions of these areas. The present invention is applicable to such documents and is concerned with distinguishing between text and image areas.

Therefore, it is among the objects of the present invention to provide an apparatus and a method of improving the quality of images and text produced by a binary printing device.

Another object of the invention is to provide a method and apparatus which distinguishes between areas of text and images when processing a monochrome or colored mixed-mode document for printing on a binary printing device, such as an ink jet printer or a laser printer.

Still another object of the invention is to provide such a method which can be implemented relatively easily either in specialized hardware or in existing printer drivers. Other objects will, in part, be obvious and will, in part, appear hereinafter.

SUMMARY OF THE INVENTION

The invention resides in a multi-stage, preprocessing technique that increases the quality of a monochrome or colored mixed-mode document printed on a binary-type printer. The document is preferably apportioned into a plurality of small tiles, each of which provides information to the inventive technique for eventually defining the modes as either text or images. Those portions of the document classified as images are then halftone processed, while the text areas are threshold processed to thereby significantly improve the reproduction quality of the printed document.

In accordance with the invention, a first stage of the preprocessing technique normalizes a non-ideal histogram of the mixed-mode document to a histogram having a substantially ideal distribution of selected pixel values. The numerical value of each pixel typically ranges from 0 to 255, corresponding to an 8-bit word. In an ideal histogram, pixel values are distributed throughout this range, including at the extremities; however, there is typically an absence of values at these extremities for the non-ideal situation. Therefore, a predetermined transfer function is used to normalize the non-ideal histogram to a transformed histogram that approximates the ideal pixel distribution. Predetermined quantities of input pixel values are applied to the transformed histogram to generate white and black threshold levels.

A second stage of the invention classifies each tile as either text, image or background by (i) calculating a white count $f_w$, a black count $f_k$ and a color count $f_c$ of pixel values in the tile, and (ii) analyzing these calculated counts in connection with a decision tree algorithm. For a colored document, each pixel is represented by three 8-bit words; accordingly, the average value of these words is preferably used when determining $f_w$, $f_k$ and $f_c$. Specifically, this average value of each pixel is initially examined in connection with the transformed histogram and thereafter alternately compared with the generated white and black constants to calculate $f_w$ and $f_k$. However, the average pixel values are not modified by the transformed histogram when calculating $f_c$, which calculation is effected by subtracting a minimum pixel value from a maximum value.

A third stage of the inventive preprocessing technique collates groups of these tiles in both vertical and horizontal directions to remove variances in the document. Here, predetermined runs of the text, image and background tiles are transposed into either text or image tiles according to a novel collating process. The resulting "cleaned-up" document text may be threshold processed, as the image and color areas are halftoned processed, to improve the reproduction quality of the mixed-mode document.

Advantageously, the inventive multi-stage preprocessing arrangement can be incorporated easily into driver software of a printing device at relatively little cost or embodied in specialized hardware in a printer port or the printer itself. When the inventive arrangement is utilized, high-quality text and halftone images of a monochrome or colored mixed-mode document may be produced by means of threshold and halftone processing.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 8 is a schematized diagram showing the classification of each tile of the mixed-mode document as text, image or background as assigned by the tile-feature extraction stage of the invention.

DETAILED DESCRIPTION OF ILLUSTRATIVE EMBODIMENT

Figure 1:
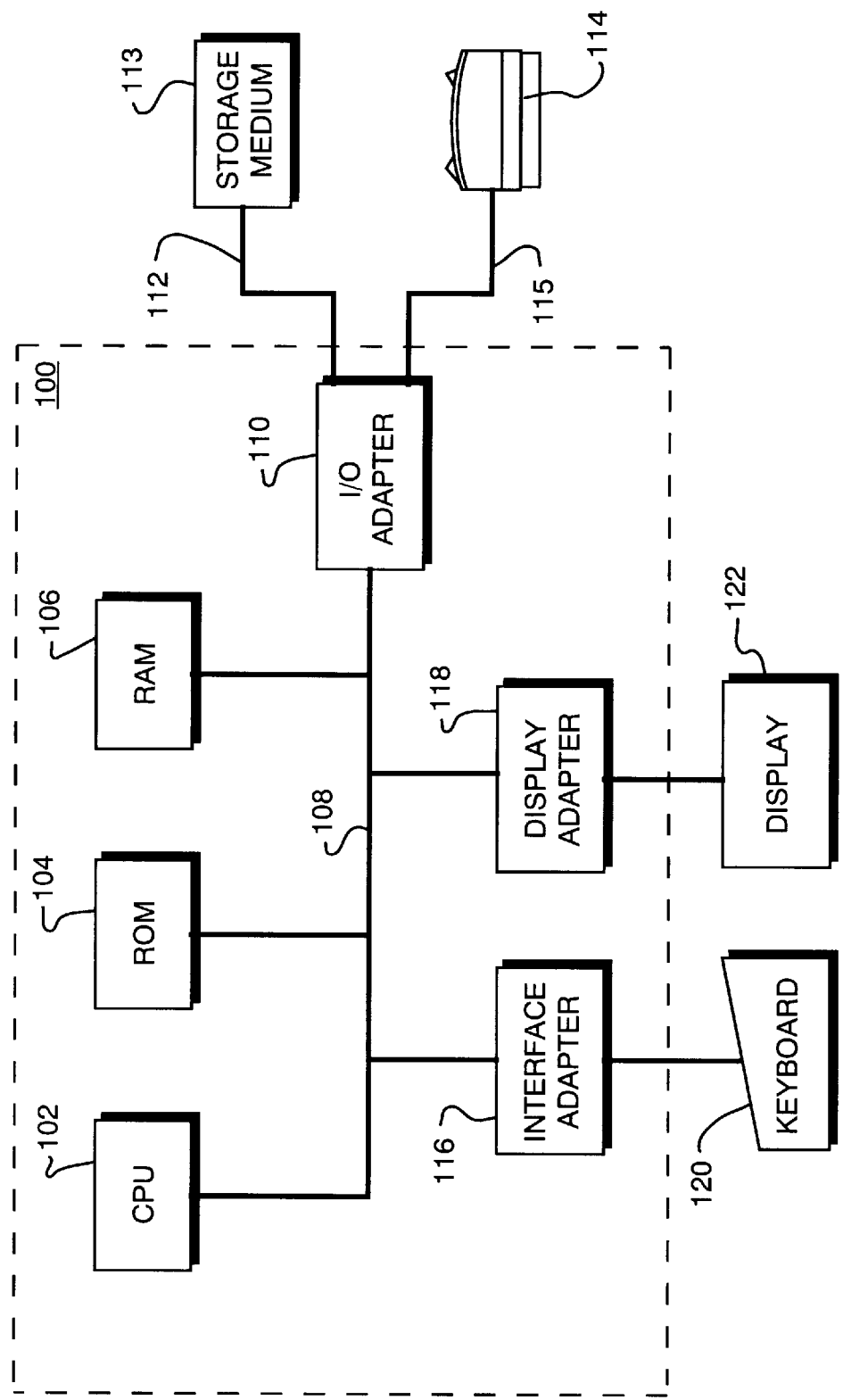
FIG. 1 is a block schematic diagram of a computer system, for example, a personal computer system on which a novel multi-stage preprocessing technique of the present invention can operate.

The invention is preferably practiced in the context of an operating system which is resident on a personal computer such as the IBM®, PS/2® or Apple® Macintosh® computer. A representative hardware environment is depicted in FIG. 1, which illustrates a typical hardware configuration of a computer 100 in accordance with the subject invention. The computer 100 is controlled by a central processing unit 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a storage medium unit 113 and printer 114 to the bus 108, via cables 115 and 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122 such as a video monitor. In addition, the computer has resident thereon, and is controlled and coordinated by, an operating system.

A computer system such as that shown in FIG. 1 generally includes a printing device which is electrically connected to the computer system and controlled by it in order to generate a permanent image on a selected medium. In order to print a document which is displayed on the monitor or stored within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include a preprocessing step in which a graphical display is converted into the form used by the printing device.

The pagination and reformatting necessary to convert the printable information into a form which can be printed a given printing device can be performed by specialized hardware, but are generally performed by software programs running within the computer system. The pagination is performed by either an application program which generated the initial output or by an operating system which is a collection of utility programs that perform basic file manipulation functions. The reformatting, including the preprocessing and halftoning operations, are specific to the printing device and are usually contained in a software program called a "driver" which may be part of the operating system, but must be specifically associated with a particular printing device. The driver program receives textual and image information from the computer system and performs the processing as described above to generate signals that can directly control the printing device.

Components of the present invention may be conveniently implemented using the computer system 100 programmed according to the teachings set forth herein, and appropriate software coding can be readily prepared based on these teachings. The present invention may also be implemented using application-specific integrated circuits or by interconnecting an appropriate network of conventional circuits, as described further below.

In the preferred embodiment, the printer driver may take the form of interdependent threads executing on the computer 100. These threads permit the system to carry out the inventive preprocessing technique when the system reads and executes their corresponding programming instructions from a computer-readable storage medium. The storage medium containing the thread instructions can include, but is not limited to, any type of disk media including floppy disks, optical disks, CD-ROMs, magneto-optical disks, hard drives or disk arrays, whether located within or external to the processing system. Alternately, the storage medium can include ROM, RAM, EPROM, EEPROM, flash EEPROM or any other type of media suitable for storing computer-readable instructions.

Figure 2:
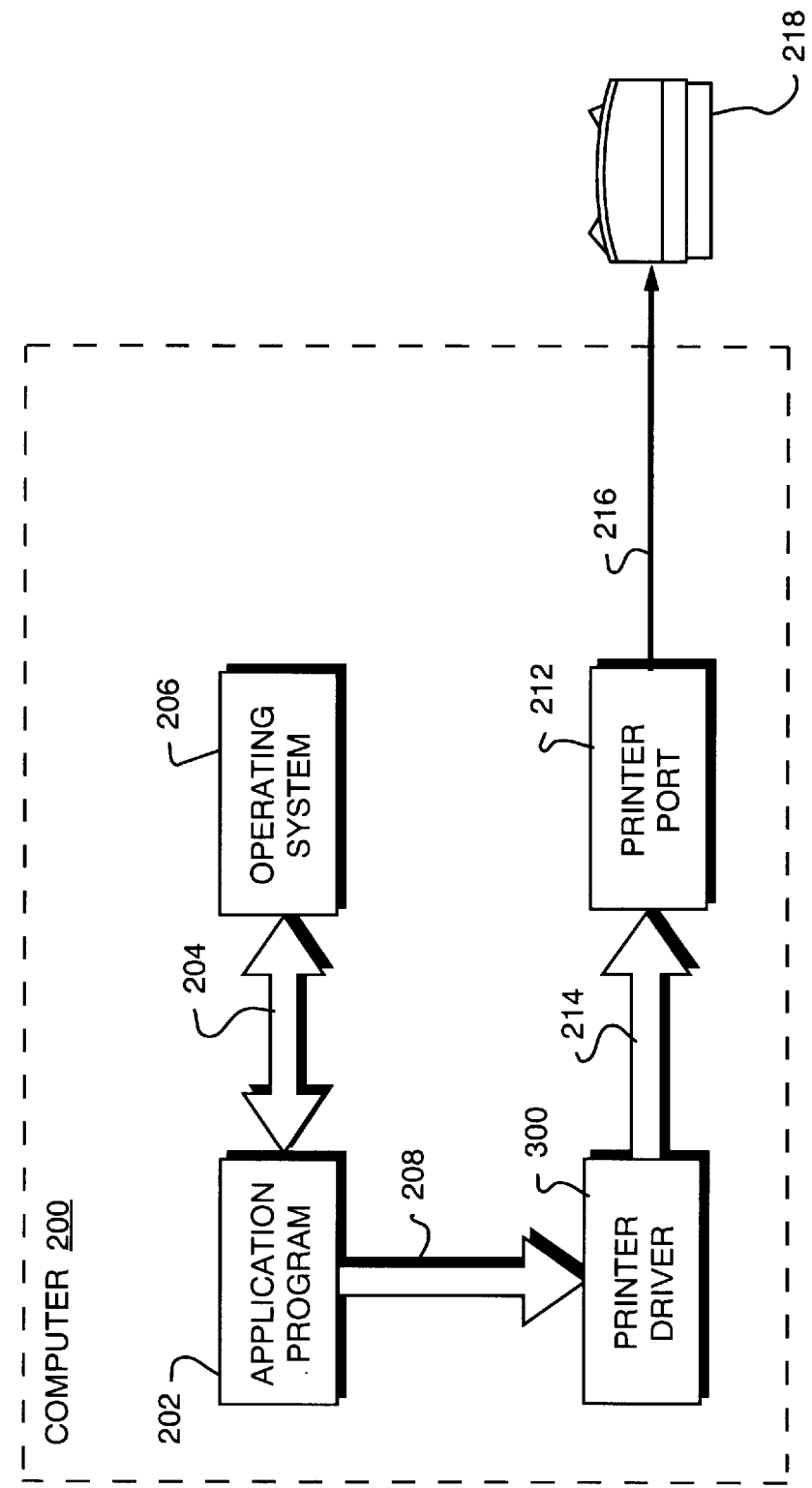
FIG. 2 is a schematic block diagram of the computer system of FIG. 1 showing the relationship of an application program, an operating system and a printer driver.

FIG. 2 is a schematic illustration of a typical computer system utilizing an application program, an operating system and a printer driver. The computer system is schematically represented by dotted box 200, the application program is represented by box 202 and the operating system by box 206. The interaction between the application program 202 and the operating system 206 is illustrated schematically by arrow 204. This dual program system is used on many types of computers systems ranging from mainframes to personal computers.

The method for handling printing, however, varies from computer to computer, and, in this regard, FIG. 2 represents a typical prior art personal computer system. In order to provide printing functions, the application program 202 interacts (as shown schematically by arrow 208) with printer driver software 300. The printer driver software 300 generally performs preprocessing operations, and may perform other operations to produce a reformatted information stream containing embedded commands and converted graphical information as shown schematically as arrow 214. The converted information stream is, in turn, applied to a printer port 212 which contains circuitry that converts the incoming information stream into electrical signals. The signals are, in turn, sent over a cable 216 to the printer 218.

Printer 218 usually contains a "imaging engine" which is a hardware device or a ROM-programmed computer which takes the incoming information stream and converts it into the electrical signals necessary to drive the actual printing elements. The result is a "hard copy"0 output on the selected media. The present inventive apparatus which performs the preprocessing process may also be incorporated into specialized hardware located in the printer port 212 or the printer 218 itself.

Figure 3:
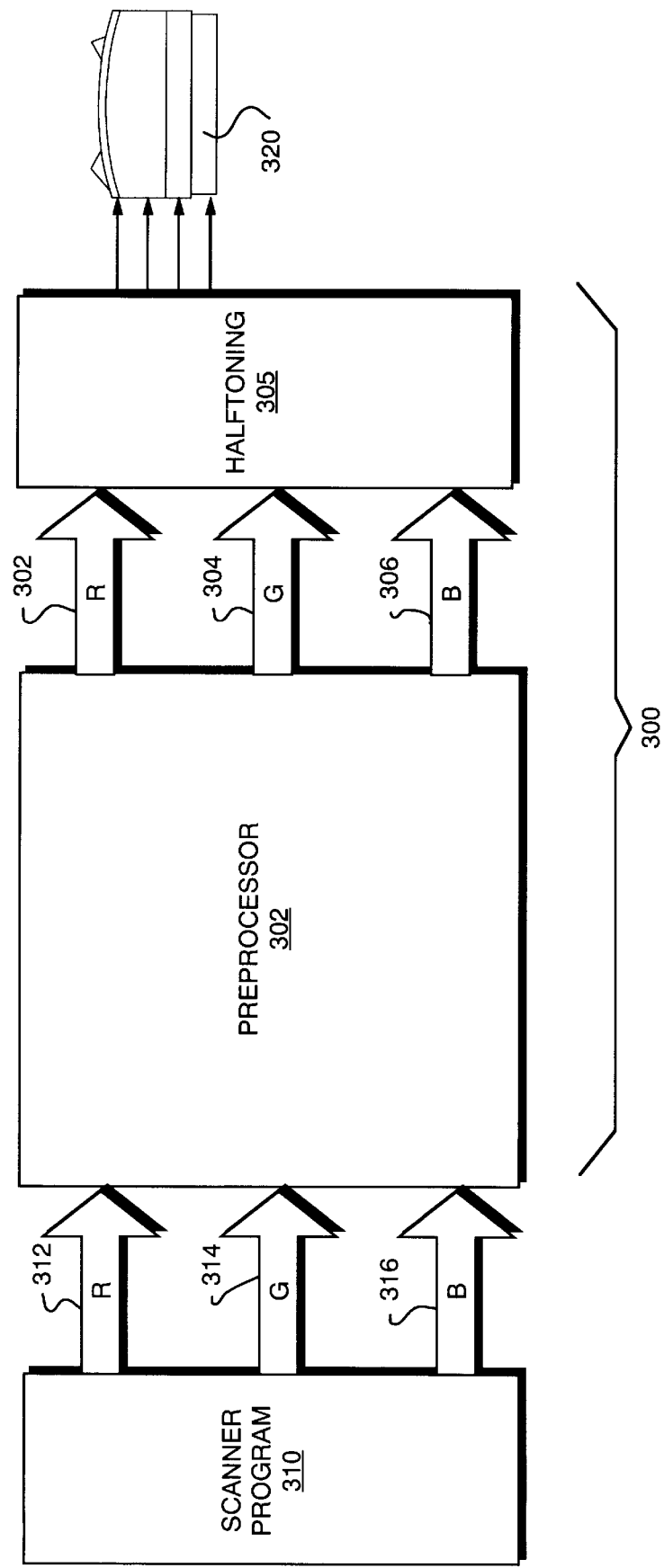
FIG. 3 is a detailed block diagram illustrating the construction of the printer driver which includes a preprocessor for increasing the quality of a mixed-mode document printed on a binary-type printer using the multi-stage, preprocessing technique in accordance with the invention.

FIG. 3 shows, in more detail, the structure of the printer driver 300. In particular, as previously mentioned, a traditional source of color information is a scanner application program 310. The scanner breaks the original image into pixels and produces a 24-bit signal representing the color of each pixel expressed as three 8-bit encoded intensities of the three primary colors. These three 8-bit signals are represented by arrows 312, 314 and 316, respectively.

The 24-bit pixel color signal is provided to the printer driver 300 which preferably comprises a preprocessor 302 and a halftoning circuit 305. The preprocessor 302 performs several operations on the input primary color values prior to halftoning. The result of these preprocessing operations is three 8-bit numbers consisting of, e.g., a red value (R), a green value (G) and a blue value (B). These three 8-bit numbers are shown schematically as arrows 302, 304 and 306. In many systems the three color values are also converted into "subtractive" primary color values cyan, magenta and yellow (C, M and Y) at this point. The three 8-bit values are applied to halftoning circuit 305 which, in a conventional manner, compresses the 32-bit signal into a 4-bit signal which is applied to the printer 320.

In particular, among the preprocessing operations, the paginated document is apportioned into a plurality of adjacent, nonoverlapping regions or tiles, each comprising n×m pixels. Typically, the resolution of the document may be either 360 dots per inch (dpi) or 720 dpi. For a document having a pixel density of 360 dpi and printed on a 8.5 inch×11 inch size paper, there is typically 3060 dots in the horizontal direction and 3960 dots in the vertical direction. Therefore, for this embodiment, n is preferably 50 and m is preferably 36.

Figure 4:
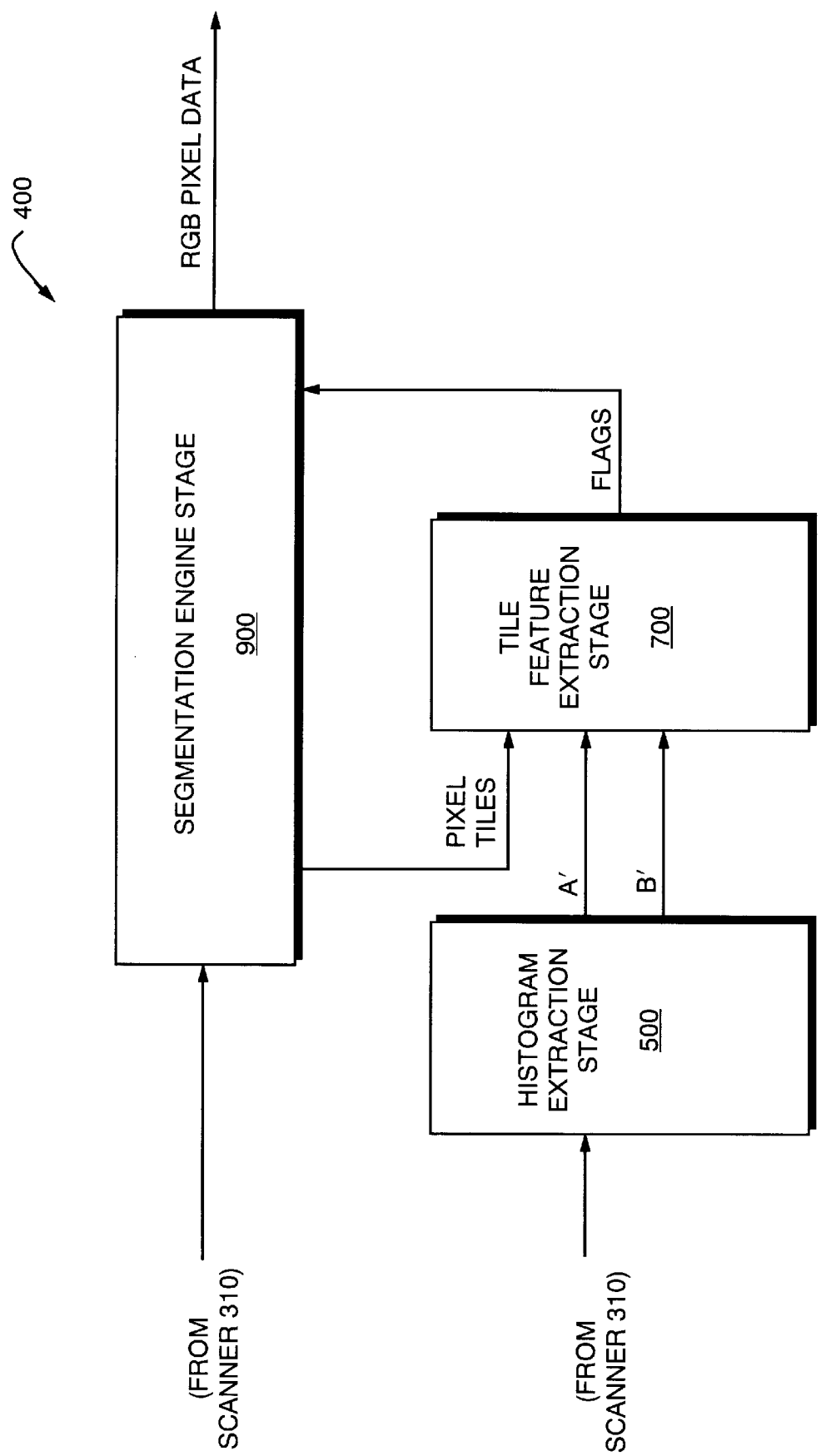
FIG. 4 is an illustrative schematic block diagram depicting a multi-stage preprocessing circuit according to the invention.

In accordance with the principles of the present invention, the preprocessor 302 may also include the inventive apparatus and method for increasing the quality of a monochrome or colored mixed-mode document printed on a binary-type printer. The inventive apparatus and method preferably comprises a multi-stage, preprocessing technique that extracts information from each tile to define the mixed modes of the document as either text or images. FIG. 4 is an illustrative schematic block diagram depicting a multi-stage preprocessing circuit 400 according to the invention. Broadly stated, the circuit 400 comprises a histogram extraction circuit stage 500 that normalizes a non-ideal histogram of the mixed-mode document to a histogram having a substantially ideal distribution of selected pixel values. A tile-feature extraction circuit stage 700 interacts with the histogram extraction circuit 500 to classify each tile as either text, image or background, while a segmentation engine stage 900 collates groups of these tiles in both vertical and horizontal directions to remove variances in the document. Thereafter, those portions of the document classified as text areas are threshold processed, while the image areas are halftone processed, to significantly improve the reproduction quality of the printed document.

Figure 5A:
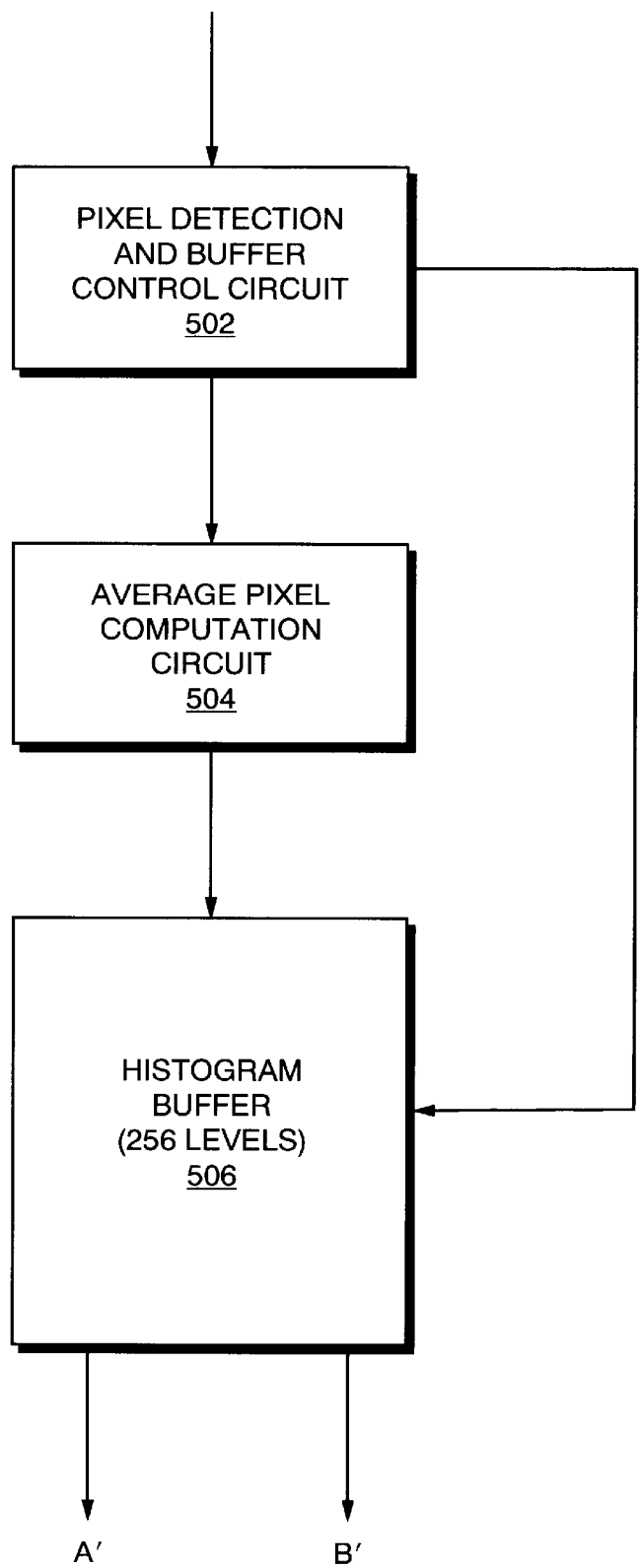
FIG. 5A is a schematic block diagram of a histogram extraction circuit of the inventive multi-stage preprocessing circuit.

FIG. 5A is an illustrative schematic block diagram of the histogram extraction circuit 500. An incoming stream of input RGB pixels represented by digital words is fed from the scanner 310 to a pixel detection and buffer control circuit 502. The circuit 502 samples a subset of these pixels to compute an initial histogram of the mixed-mode document which, together with a predetermined transfer function, enables generation of a normalized transformed histogram.

The RGB pixels pass serially through the detection and control circuit 502 and into a conventional average pixel computation circuit 504 configured to compute the average values of the input pixels. These averaged values are then stored in a histogram buffer 506 controlled by the detection and control circuit 502. Specifically, the circuit 502 controls the buffer 506 by providing proper storage locations for the input values prior to selecting corresponding output values after the normalizing operations described below.

Figure 5B:
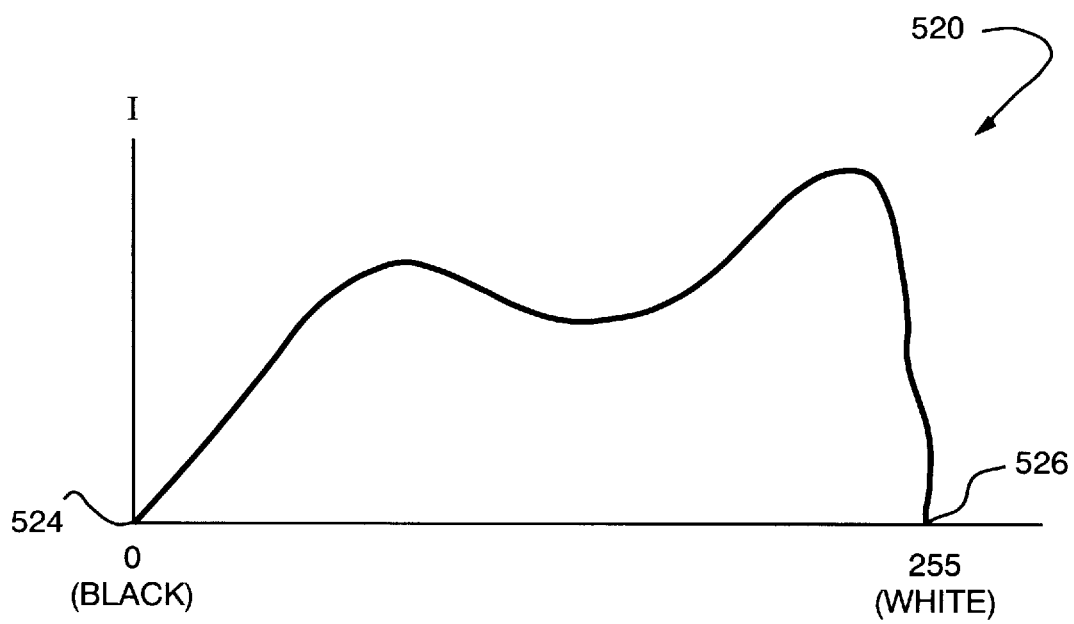
FIGS. 5B–5E illustrate various graphs, including a transfer function, employed by a first histogram extraction stage of the multi-stage preprocessing technique to normalize an initial histogram of the mixed-mode document to a histogram having an ideal distribution of selected pixel values.
Figure 5C:
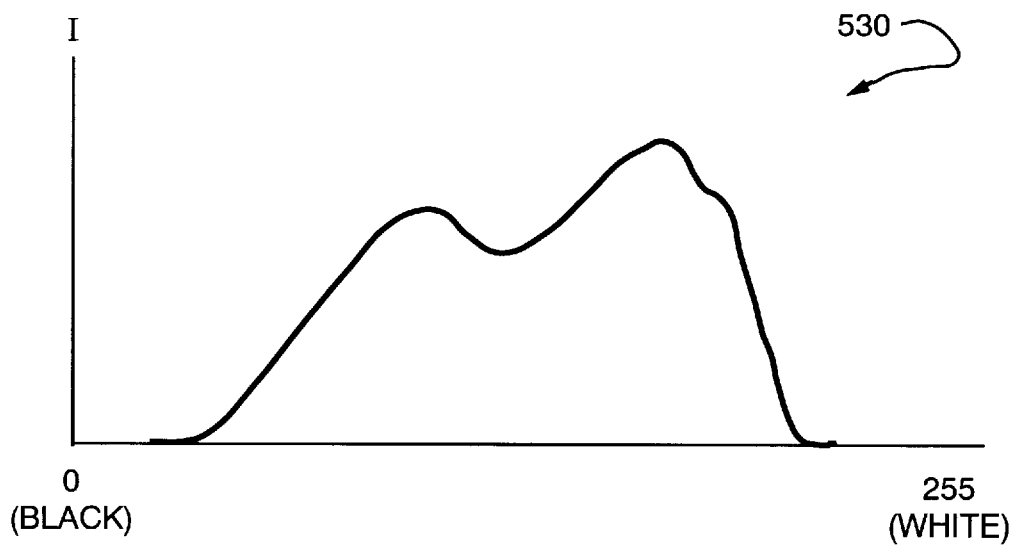

As noted, the numerical value of each pixel typically ranges from 0 to 255, corresponding to an 8-bit word. In an ideal histogram 520 as shown in FIG. 5B, the frequency distribution of pixel values envelopes this entire 256-value range, including the extremities 524 and 526. However, in the case of a typical mixed-mode document, there is an absence of pixel values at these extremities; this is illustrated as the initial document histogram 530 of FIG. 5C.

Figure 5D:
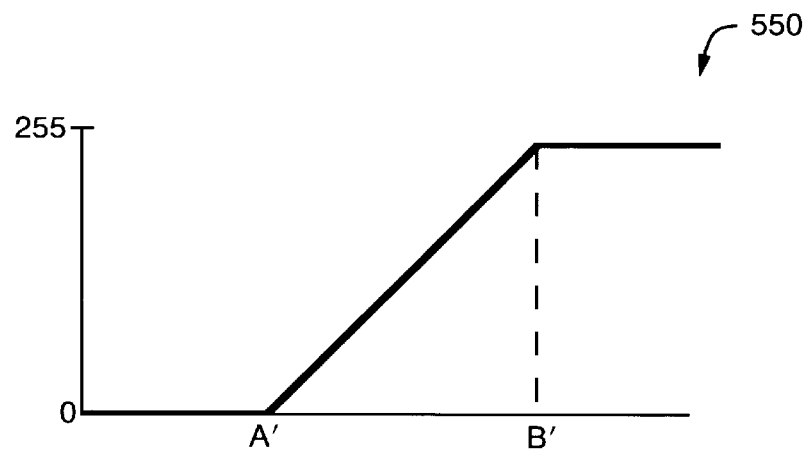
Figure 5E:
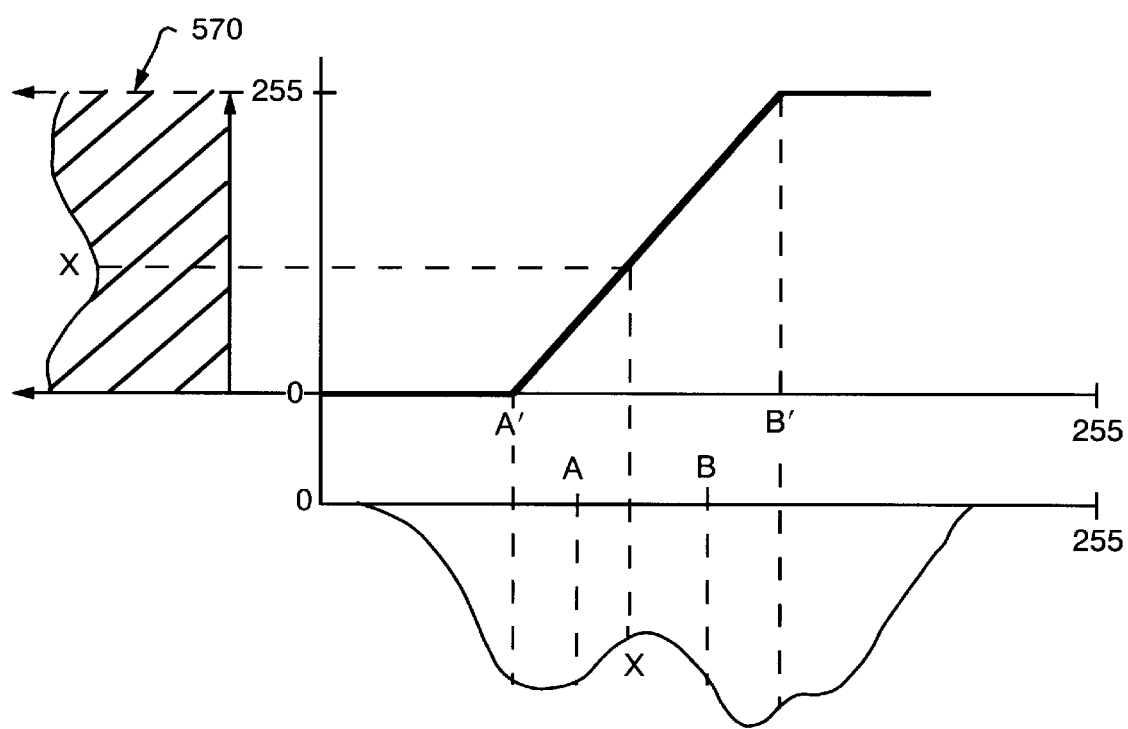

Therefore, in accordance with an aspect of the invention, the pixel detection and control circuit 502 of the histogram extraction stage 500 provides a predetermined transfer function 550 (FIG. 5D) for normalizing the initial document histogram to a transformed histogram. This transformed histogram 570, shown in FIG. 5E, approximates the ideal pixel distribution to ensure proper processing of the document. Functionally, the transfer function 550 is applied to the initial document histogram 530 to create the transformed histogram 570. The averaged pixel data is then provided to the transformed histogram 570 to generate black (A') and white (B') threshold levels at the outputs of the histogram extraction circuit stage 500.

Figure 6:
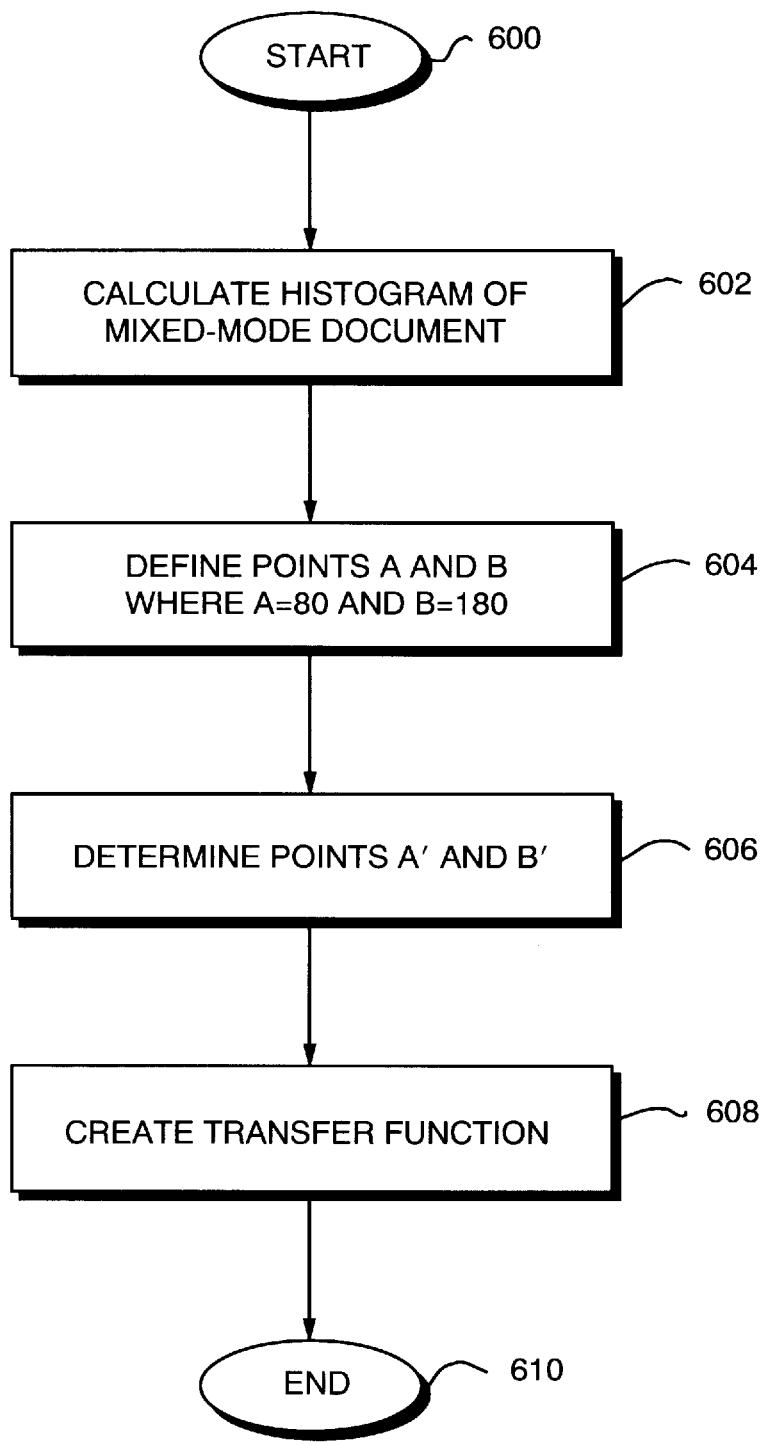
FIG. 6 is a flowchart illustrating the sequence of steps implemented by the first histogram extraction stage to develop the transfer function of FIG. 5D.

The flowchart of FIG. 6 illustrates the sequence of steps followed to develop the transfer function 550 used to generate the normalized transformed histogram 570. The sequence starts at Step 600 and proceeds to Step 602 where a histogram of the values of pixels of the mixed-mode document is initially calculated. In the illustrative embodiment, low resolution data (e.g., 50 dpi) is used to preview the processed information. In Step 604, ideal points A and B are defined where, for an 8-bit representation, A is 80 and B is 180. Next, point A' is determined (Step 606), such that the number of pixels from 0 to A' is X% of the number of pixels from 0 to A and where X is preferably 85, and point B' is determined, such that the number of pixels from 255 to B' is Y% of the number of pixels from 255 to B; here, Y is preferably 50. Using these points, the resulting transfer function 550 is created in Step 608 and the sequence ends in Step 610.

Figure 7:
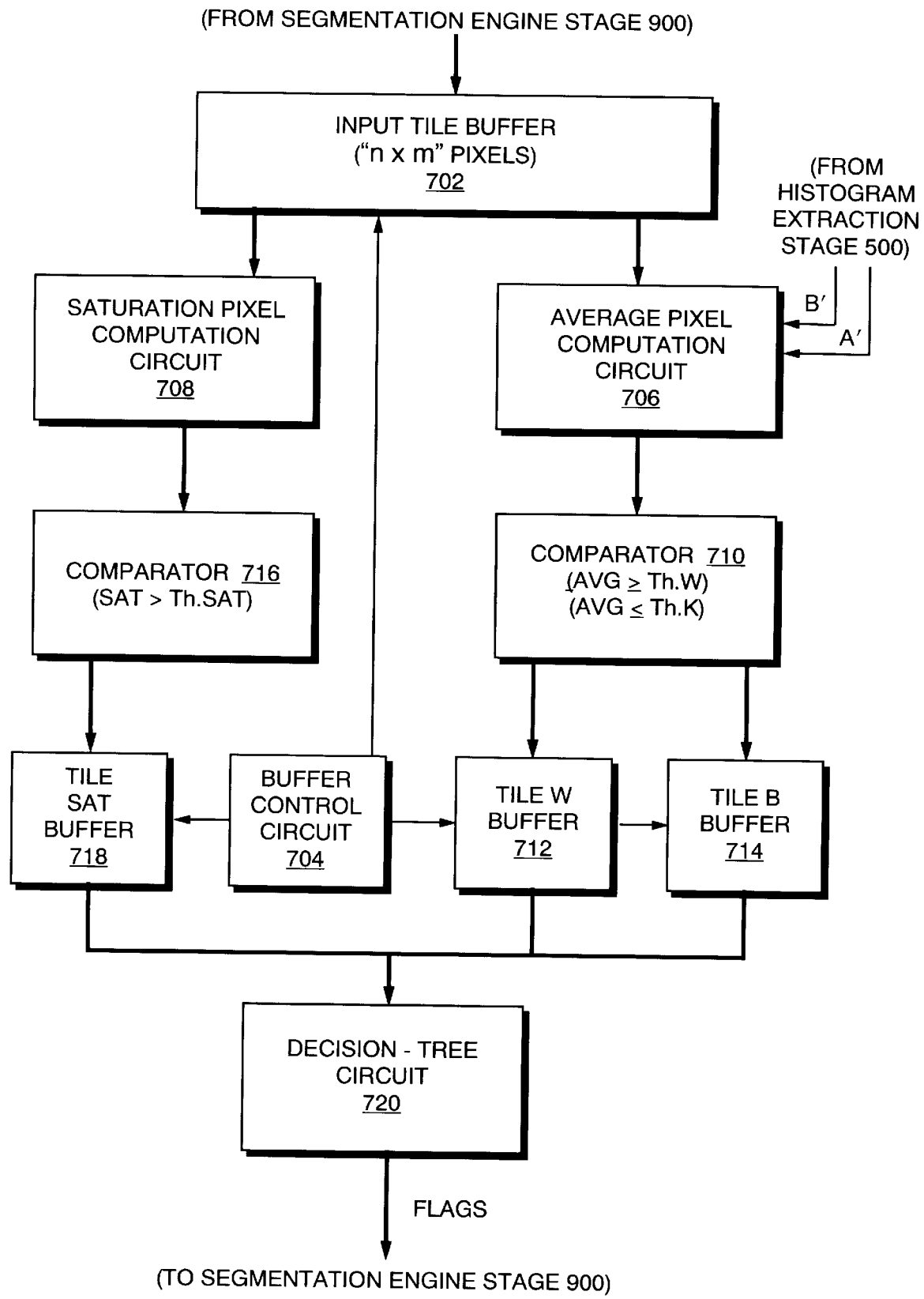
FIG. 7 is a schematic block diagram of a tile-feature extraction circuit of the inventive multi-stage preprocessing circuit.

FIG. 7 is a schematic block diagram of the tile-feature extraction circuit stage 700 which, logically, may be envisioned as embedded within the segmentation engine stage 900. Referring first to the schematic block diagram of this latter segmentation stage 900 in FIG. 9, high resolution (e.g., 360 dpi) data are provided to a pixel detection and control circuit 902. As noted, each pixel of a gray scale or colored document is represented by three 8-bit words; these words are provided to the circuit 902 in the form of bands of n×m pixels (e.g., tiles). Preferably, the bands are organized in groups of N tiles, where N is equal to the width (columns) of the document. The bands of tiles pass through the detection and control circuit 902, which examines the arrangement of these bands prior to loading them into band buffer 904. The buffer 904 is preferably organized to store the pixels in groups of respective N tiles. A buffer control circuit 905 controls the buffer 904 to output the stored pixels, in band order, to a tile extraction circuit 906. The extraction circuit 906 is configured to extract individual tiles of pixels from the bands in response to a control signal generated by detection and control circuit 902. These individual tiles are then provided to the tile-feature extraction circuit stage 700.

This second, tile-feature extraction stage 700 shown in FIG. 7 classifies each tile as either text, image or background according to a two-step process that (i) calculates a white count $f_w$, a black count $f_k$ and a color count $f_c$ of pixel values in the tile in response to threshold levels provided, in part, by the histogram extraction circuit 500, and (ii) analyzes these calculated counts in connection with a decision tree algorithm. Each tile is initially stored in an input tile buffer 702 that is controlled by buffer control circuit 704 to output the stored pixel words of the tiles to either an average pixel computation circuit 706 or a saturation pixel computation circuit 708.

Specifically, average values of these words are determined by the circuit 706 prior to calculating $f_w$ and $f_k$. The average value at each pixel i,j in each tile is defined as:

$$P(i,j) = \frac{(r_{i,j} + b_{i,j} + g_{i,j})}{3}$$

where, $r_{i,j}$, $b_{i,j}$ and $g_{i,j}$ are the primary color components for the i,jth pixel. These average values are modified by the linear ramp function shown in FIG. 5D and defined by the A' and B' threshold levels provided by the histogram extraction circuit 500. The modified values are then provided to a comparator circuit 710 which compares the values with predetermined constant threshold levels Th.B and Th.W. In particular, the black (Th.K) and white (Th.W) constant threshold levels are alternately compared with the modified average value of each pixel to calculate $f_w$ and $f_k$, respectively. The results of the comparison operations are flags indicating whether the pixels are white (and thus contributing to $f_w$) or black (and contributing to $f_k$); these results are loaded into respective white tile buffer 712 or black tile buffer 714, each of which is controlled by buffer control circuit 704.

The psuedo-code for calculating $f_w$ for each tile is:
$N_w=0$
  do for each pixel in the tile
    if $f(P(i,j)) \geq Th.W$, where Th.W=220 and f(x) is function of FIG. 5D
    then $N_w=N_w+1$;
    else, go to next pixel;
  end.

$$f_w = \frac{N_w}{n \times m}$$

The psuedo-code for calculating $f_k$ for each tile is:
$N_k=0$
  do for each pixel in the tile
    if $f(P(i,j)) \leq Th.K$, where Th.K=50 and f(x) is function of FIG. 5D
    then $N_k=N_k+1$;
    else, go to next pixel;
  end.

$$f_k = \frac{N_k}{n \times m}$$

where, $f_w + f_k \leq 1$.

However, these average pixel values P(i,j) are not modified by the transformed histogram 570 when calculating $f_c$;

instead, the color count calculation is effected by subtracting a minimum average value from a maximum average value for each tile, as performed by saturation pixel computation circuit 708. The saturation values pertaining to color counts are then compared to a fixed saturation threshold level Th.Sat (e.g., 20) by comparator 716 to calculate $f_c$. The results of the comparison operations are flags indicating whether the pixels are colored and thus contributing to $f_c$; these results are loaded into a saturation tile buffer 718 by control circuit 704. The pseudo-code for calculating $f_c$ for each tile is:

Calculate the average value of each pixel:

$$r_a = \frac{1}{n \times m} \sum_{i=0}^{n-1} \sum_{j=0}^{m-1} r_{i,j}$$

$$g_a = \frac{1}{n \times m} \sum_{i=0}^{n-1} \sum_{j=0}^{m-1} g_{i,j}$$

$$b_a = \frac{1}{n \times m} \sum_{i=0}^{n-1} \sum_{j=0}^{m-1} b_{i,j}$$

Subtract the average minimum value from the average maximum value:

$f_c = \mathrm{Max}(r_a, g_a, b_a) - \mathrm{Min}(r_a, g_a, b_a)$

The second step of this classification process involves decision tree circuit 720 to determine whether the tile should be classified as text (T), image (I) or background (B). The buffer control circuit 704 outputs the contents of buffers 712, 714 and 718 to circuit 720 where they are analyzed according to the following algorithm:

If $f_w \geq k_w$,
  Then if $f_k \geq k_k$,
    then if $f_c \geq k_c$,
      then tile=I
      else tile=T
    else if $f_c \geq k_c$,
      then tile=I
      else tile=B
  Else tile=I
  where $k_w$=30%, $k_k$=10% and $k_c$=14–19% for color documents, and $k_w$=30% and $k_k$=2% for gray scale documents. The output of decision tree circuit 720 is a flag (e.g., having 1 byte of state information) which designates to each tile of the document a classification of T, I or B; this is shown schematically in FIG. 8 as processed document 800. These flags are then provided to the segmentation engine stage 900.

Figure 9:
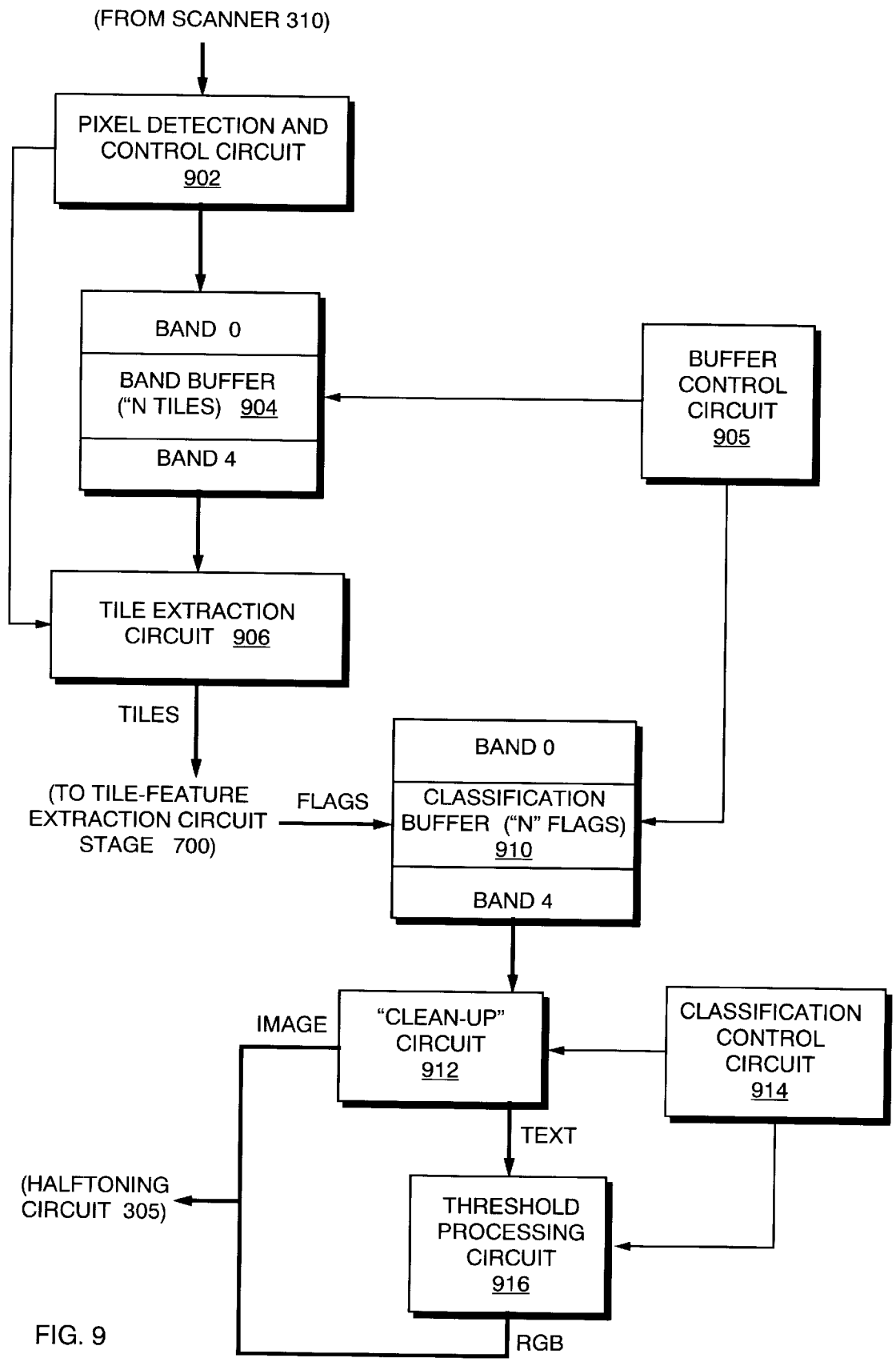
FIG. 9 is a schematic block diagram of an illustrative segmentation engine circuit of the multi-stage preprocessing circuit according to the present invention.

As noted, FIG. 9 is a schematic block diagram of the segmentation engine circuit 900 used to implement a third stage of the present invention. In general, this third stage of the inventive preprocessing technique collates groups of the classified tiles in both vertical and horizontal directions to remove variances in the document. Here, predetermined runs of the T, I and B tiles are transposed into either text or image tiles according to a novel collating process described herein.

Initially, the flags are loaded into a classification buffer 910 under the control of buffer control circuit 905. The classification buffer 910 contains a plurality of band entries, each of which is similarly configured to the band structure of buffer 904; that is, each entry stores a group of N flags, where N is equal to the width (columns) of the mixed-mode document. Moreover, the buffer 910 is of sufficient size to store five (5) rows of tiles having a predetermined number of columns (e.g. 50) depending upon the width of the document; however, it should be understood that other buffer sizes are contemplated within the teachings of the invention.

The control circuit 905 enables the buffer 910 to deliver the flags to a "clean-up" circuit 912. However, it should be noted that the contents of band 0 are not delivered to circuit 912 but are, in fact, maintained in the buffer 910 for their classification results which are used in accordance with the clean-up algorithm described below. Specifically, classification control circuit 914 controls clean-up circuit 912 to collate groups of the classified tiles in vertical and horizontal directions according to a collating process defined by the following pseudo-code:

I. Clean-up small runs of text ($R_T$) in the horizontal direction
  if $R_T < k_T$, where $k_T = 3$
  then change T to I
  else no change II. Clean-up small runs of text ($R_T$) in the vertical direction
  if $R_T < k_T$, where $k_T = 3$
  then change T to I
  else no change III. Clean-up small runs of image ($R_I$) in the horizontal direction
  if $R_I < k_I$, where $k_I = 2$
  then change I to T
  else no change IV. Clean-up small runs of image ($R_I$) in the vertical direction
  if $R_I < k_I$, where $k_I = 2$
  then change I to T
  else no change V. Clean-up runs of background ($R_B$) in the horizontal direction
  i. if $R_B$ between T,
    then change B to T
    else no change
  ii. if $R_B$ between I,
    then change B to I
    else no change
  iii. if $R_B$ between T and I,
    then change B to I,
    except for B adjacent to T,
    then subdivide B into I and T
    else no change As noted, the predetermined runs of the T, I and B tiles are thus transposed by the collating process into solely text and image tiles. After processing the 5 bands/rows (e.g., rows 0–4) of the document, the processed contents of row 1 are delivered to the outputs of circuit 912. The flags of rows 0–3 are then overwritten with the contents of rows 1–4 and a sixth row of the document is loaded into the buffer from the tile-feature extraction circuit 700 as new row 4. The collating process described above is again executed with the contents of new row 1 being provided to the outputs of circuit 912. This procedure continues until all of the rows of the document are collated.

Those tiles classified as text (T) are then provided to a threshold processing circuit 916 under control of the classification control circuit 914. There, the text tiles are threshold processed (i.e., the pixel values are compared with a threshold value of, for example, 160) and the results are thereafter provided, along with those tiles classified as image areas, to halftoning circuit 305.

While there has been shown and described an illustrative embodiment for increasing the quality of a monochrome or colored mixed-mode document printed on a binary-type printer in accordance with a multi-stage, preprocessing technique, it is to be understood that various other adaptations and modifications may be made within the spirit and scope of the invention. For example, it will be apparent to those skilled in the art that the control and computation circuits described herein contain circuitry (e.g., comparators, adders, registers, etc.) needed to implement logical and arithmetic operations for detecting certain pixel conditions and manipulating pixel values in order to generate correct binary pixel values for printing text and image areas of the mixed-mode document. The exact circuit configurations of these circuits, along with the exact arithmetic, logical and synchronizing operations performed by those circuits can be varied without departing from the spirit of the invention.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description as shown in the accompanying drawing shall be interpreted as illustrative and not in the limiting sense. It is also to be understood that the following claims are intended to cover all of the generic and specific features of the invention described herein.

What is claimed is:

1. A method for increasing the quality of a monochrome or colored mixed-mode document apportioned into a plurality of tiles containing pixel values prior to printing on a binary-type printer, the method comprising the steps of:

(a) providing a predetermined histogram;

(b) obtaining an initial histogram from a predetermined quantity of the pixel values;

(c) determining a transfer function in accordance with the predetermined histogram and the initial histogram;

(d) applying the transfer function to the initial histogram to obtain a transformed histogram;

(e) providing the predetermined quantity of the pixel values to the transformed histogram to generate black and white threshold levels;

(f) calculating a white count and a black count of pixel values for each tile in response to the generated white and black threshold levels, and further calculating a color count of pixel values for each tile;

(g) analyzing the calculated counts in connection with a decision tree circuit to classify each tile as text, image or background; and (h) collating groups of the classified tiles in vertical and horizontal directions to transpose classification of those tiles to text or image tiles, whereby the image tiles are halftone processed and the text tiles are threshold processed to improve the reproduction quality of the printed mixed-mode document.

2. The method of claim 1 wherein the step (c) comprises the steps of:

defining ideal points on the initial histogram; and generating the transfer function in response to the defined points.

3. The method of claim 1 wherein the step of calculating comprises the steps of:

determining average values for the pixels of each tile; and one of alternately comparing the average values with the white and black levels to generate the white count and black count; and subtracting a minimum average value from a maximum average value to generate the color count.

4. The method of claim 1 wherein the step of collating comprises the steps of:

comparing runs of text tiles in the horizontal and vertical directions with a predetermined text constant value; and changing the classification of the text tiles to image tiles if the number of text tiles in the run is less than the text constant value.

5. The method of claim 4 wherein the step of collating further comprises the steps of:

comparing runs of image tiles in the horizontal and vertical directions with a predetermined image constant value; and changing the classification of the image tiles to text tiles if the number of image tiles in the run is less than the image constant value.

6. The method of claim 5 wherein the step of collating still further comprises the steps of:

examining runs of background tiles in the horizontal direction; and one of if the background tiles lie between text tiles, changing the classification of the background tiles to text tiles; and if the background tiles lie between image tiles, changing the classification of the background tiles to image tiles.

7. Apparatus of a multi-stage preprocessing circuit for increasing the quality of a monochrome or colored mixed-mode document the document apportioned into a plurality of input pixels organized as tiles prior to being printed on a binary-type printer, the apparatus comprising:

a preprocessing circuit that normalizes a non-ideal histogram of the mixed-mode document to a histogram having an ideal distribution of Pixel values:

a pixel computation circuit for computing average values of the input pixels;

a histogram buffer for storing the average values as input values; and a pixel detection and buffer control circuit configured to sample a subset of the pixels used in said preprocessing circuit, the pixel detection and control circuit controlling the histogram buffer by providing proper storage locations for the input values prior to selecting corresponding output values after execution by said preprocessing circuit.

8. Apparatus of a multi-stage preprocessing circuit for increasing the quality of a monochrome or colored mixed-mode document apportioned into a plurality of input pixels organized as tiles by classifying each tile as text, image or background prior to being printed on a binary-type printer, the apparatus comprising:

a preprocessing circuit that determines a transfer function from a non-ideal histogram of the mixed-mode document to a histogram having an ideal distribution of pixel values;

a pixel computation circuit for computing average values of the input pixels;

a first comparator for alternately comparing the average values with white and black threshold levels in accordance with the transfer function to generate flags indicating whether the pixels of each tile are white or black;

a plurality of tile buffers for storing the generated flags;

a buffer control circuit configured to control input and output of the tile buffers; and a decision tree circuit, responsive to the generated flags, for designating to each tile a classification of text, image or background.

9. The apparatus of claim 8 further comprising:
- a saturation pixel computation circuit that subtracts a minimum average value from a maximum average value for each pixel to produce a saturation value;
- a second comparator for comparing the saturation value with a fixed saturation threshold level to generate color flags indicating whether the pixels of each tile are colored; and
- a saturation tile buffer for storing the color flags, the saturation buffer controlled by the buffer control circuit.

10. A multi-stage preprocessing apparatus for increasing the quality of a monochrome or colored mixed-mode document apportioned into a plurality of input pixels organized as tiles prior to being printed on a binary-type printer, the multi-stage apparatus comprising:
- a tile-feature extraction circuit for classifying each tile as text, image or background;
- a segmentation engine circuit for collating groups of the tiles in vertical and horizontal directions to transpose classification of the tiles to text or image tiles; and
- a histogram extraction circuit for normalizing a non-ideal histogram of the mixed-mode document to a histogram having an ideal distribution of pixel values, the histogram extraction circuit generating white and black threshold levels that are applied to the tile-feature extraction circuit.

11. The multi-stage apparatus of claim 10, wherein the histogram extraction circuit comprises:
- a first pixel computation circuit for computing average values of the input pixels;
- a histogram buffer for storing the average values as input values; and
- a pixel detection and buffer control circuit configured to sample a subset of the pixels used in the execution of normalizing operations, the detection and control circuit controlling the histogram buffer by providing proper storage locations for the input values prior to selecting corresponding output values after execution of the normalizing operations.

12. The multi-stage apparatus of claim 11 wherein the tile-feature extraction circuit comprises:
- a second pixel computation circuit for computing average values of the input pixels;
- a first comparator for alternately comparing the average values with white and black threshold levels to generate flags indicating whether the pixels of each tile are white or black;
- a plurality of tile buffers for storing the generated flags;
- a buffer control circuit configured to control input and output of the tile buffers; and
- a decision tree circuit, responsive to the generated flags, for designating to each tile a classification of text, image or background.

13. The multi-stage apparatus of claim 12 wherein the tile-feature extraction circuit further comprises:
- a saturation pixel computation circuit that subtracts a minimum average value from a maximum average value for each pixel to produce a saturation value;
- a second comparator for comparing the saturation value with a fixed saturation threshold level to generate color flags indicating whether the pixels of each tile are colored; and
- a saturation tile buffer for storing the color flags, the saturation buffer controlled by the buffer control circuit.

14. The multi-stage apparatus of claim 13 wherein the segmentation engine circuit comprises:
- a classification buffer containing a plurality of band entries for storing predetermined groups of flags; and
- a clean-up circuit for collating and transposing the predetermined groups of tiles according to a predetermined collating process.

15. A computer medium having computer readable program code embodied thereon for causing a computer system having a processor, an input device, a memory and a binary-type printer to increase the quality of a monochrome or colored mixed-mode document printed on the printer by performing the steps of:
- a) apportioning the document into a plurality of tiles containing input pixels;
- b) computing average values of the input pixels;
- c) subtracting a minimum average value from a maximum average value for each pixel to produce a saturation value;
- d) providing a predetermined histogram;
- e) obtaining an initial histogram from a predetermined quantity of pixel values;
- f) determining a transfer function in accordance with the predetermined histogram and the initial histogram;
- g) applying the transfer function to the initial histogram to obtain a transformed histogram;
- h) providing the predetermined quantity of the average values to the transformed histogram to generate black and white threshold levels; and one of
- i) alternately comparing the average values with white and black threshold levels to generate flags indicating whether the pixels of each tile are white or black; and
- j) comparing the saturation value with a fixed saturation threshold level to generate color flags indicating whether the pixels of each tile are colored.

16. The computer medium of claim 15, further comprising the steps of:
- analyzing the generated flags in connection with a decision tree circuit to classify each tile as text, image or background; and
- collating groups of the classified tiles in vertical and horizontal directions to transpose classification of those tiles to text or image tiles.

17. An apparatus for increasing the quality of a monochrome or colored mixed-mode document apportioned into a plurality of tiles containing pixel values prior to printing on a binary-type printer, the apparatus comprising:
- a preprocessing circuit that obtains an initial histogram from a predetermined quantity of the pixel values and determines a transfer function in accordance with a predetermined histogram and the initial histogram;
- a computation circuit that generates black and white threshold values in accordance with the predetermined quantity of the pixel values and the transfer function determined by said preprocessing circuit;
- a calculating circuit that calculates a white count and a black count of pixel values for each tile in response to the generated white and black threshold levels, and that further calculates a color count of pixel values for each tile;
- an analyzing circuit that analyzes the calculated counts calculated by said calculating circuit in connection with a decision tree circuit to classify each tile as text, image or background;

a collating circuit that collates groups of the classified tiles in vertical and horizontal directions classified by said analyzing circuit to transpose classification of those tiles to text or image tiles, and image processing circuit whereby the image tiles are halftone processed and the text tiles are threshold processed.

18. The apparatus of claim 17, wherein said preprocessing circuit further:

defines ideal points on the initial histogram; and generates the transfer function in response to the defined points.

19. The apparatus of claim 17, wherein said calculating circuit further:

determines average values for the pixels of each tile; and one of alternately compares the average values with the white and black levels to generate the white count and black count; and subtracts a minimum average value from a maximum average value to generate the color count.

* * * * *